W. H. Shurtleff,
Shoe Fastening.

Nº 65,615.   Patented June 11, 1867.

Witnesses;
J A Duncan
M Bailey

Inventor;
W. H. Shurtleff by
A Rourk
his atty

United States Patent Office.

WILLIAM HENRY SHURTLEFF, OF PROVIDENCE, RHODE ISLAND.

*Letters Patent No. 65,615, dated June 11, 1867; antedated May 9, 1867.*

IMPROVEMENT IN BUTTON-LACING HOOKS.

*The Schedule referred to in these Letters Patent and making part of the same.*

TO WHOM IT MAY CONCERN:

Be it known that I, WILLIAM HENRY SHURTLEFF, of Providence, in the county of Providence, and State of Rhode Island, have invented certain new and useful improvements in Lacing for Boots, Shoes, and other articles; and I hereby declare the following to be a full, clear, and exact description of the same, reference being had to the accompanying drawings, in which—

Figure 1:

Figure 1 represents in perspective a lacing-hook and button; and

Figure 2:

Figure 2, a like view of a modification of the same.

Figure 3:
Figure 4:

Figures 3 and 4 being sectional views of the devices shown respectively in figs. 1 and 2.

My invention relates to that kind of lacing device consisting of a combined hook and button for which Letters Patent have been heretofore granted me, and its object is to better adapt the device for general use by so constructing it that the hook, or lacing-stay proper, may be attached to and used with a button made separately from the hook, and composed of rubber, hoof, metal, or other suitable material, moulded or otherwise shaped in any desired form. To do this I make the lacing-hook of a strip of metal, cut or stamped into the proper size and shape, one end being shaped like a disk, from which extend prongs for holding the hook in place. The metal strip is then bent so as to form a hook, the disk from which the prongs extend lying in a plane parallel, or nearly so, with that part of the strip which forms the upper jaw of the hook. The upper end or shank of the strip is bent upwards at right angles to the plane of the disk. The hook thus formed is attached to a button made of rubber, hoof, or like material, by heating it, and then pressing the upper part, while in this heated state, into the button. If the button is of metal the hook can be attached thereto by soldering or brazing, or other suitable means; or the hook may be united with either a metal, or rubber, or other button, by having the shank of the hook extend upward through the button, and then riveting it.

To enable those skilled in the art to understand and use my invention, I will now proceed to describe it, by reference to the accompanying drawings.

In fig. 1 the device is turned upside down, so as to show more clearly the arrangement of parts. The lacing-hook or stay consists of a piece of metal, $a$, one end, $b$, of which is disk-shaped, and has attached to it prongs $e$, which pass through the leather or cloth to which the button and hook are to be secured, and are then clenched. From the disk $b$ the metal strip extends a short distance, then is bent so as to form a hook, $c$, the upper portion of the strip being in a plane parallel, or nearly so, to the plane of the disk. The upper end or shank $d$, fig. 3, is bent so as to be at right angles, or thereabouts, to the plane of the disk, as hereinbefore mentioned. The hook thus formed is attached, as shown in fig. 3, to a button, $f$, of hoof, rubber, or other like material, shaped and ornamented to suit the taste of the wearer. The hook being heated, its upper end is pressed against and into the under side of the button, and is embedded firmly and tightly therein. The shank $d$ is inserted in or near the centre of the button, so as to avoid the injury or displacing of the latter, which might occur if it were inserted near the edge. In figs. 2 and 4 a modification of the device is shown, the shank $d$ being, in this case, carried up through the button, and there riveted at $g$. If the button be made of metal, the shank $d$, as above mentioned, may be soldered or brazed to it, or secured thereto in any other suitable manner. The stock of which the hook is made may be either flat or wire-shaped. The hook $c$ is curved transversely, so as to prevent the abrasion of the lacing-cord.

Having described my invention, and the manner in which the same is or may be carried into effect, what I claim, and desire to secure by Letters Patent, is as follows:

1. I claim making a button-hook in which the hook is within the periphery of and eccentric to the button, of two separate and distinct parts, united together at or near the centre of the button substantially as herein shown and described.

2. As a new article of manufacture, I claim a lacing-hook and button, in which the button is made of horn, hoof, rubber, or other like material, and the hook of metal, the two being combined together substantially in the manner herein shown and described.

In testimony whereof I have signed my name to this specification before two subscribing witnesses.

WM. HENRY SHURTLEFF.

Witnesses:
   THOS. J. PECKHAM,
   H. A. CHURCH.